United States Patent [19]
Pronger, Jr. et al.

[11] Patent Number: 4,584,843
[45] Date of Patent: Apr. 29, 1986

[54] METHOD AND APPARATUS OF STORING ICE SLURRY AND ITS USE FOR COOLING PURPOSES

[75] Inventors: Oliver M. Pronger, Jr., Blue Island; Charles M. Heavener, Lisle, both of Ill.

[73] Assignee: Chicago Bridge & Iron Company, Oak Brook, Ill.

[21] Appl. No.: 668,408

[22] Filed: Nov. 5, 1984

[51] Int. Cl.⁴ .............................................. B01D 9/04
[52] U.S. Cl. ...................................... 62/123; 62/434; 165/104.17
[58] Field of Search .......................... 62/59, 123, 434; 165/104.17

[56] References Cited

U.S. PATENT DOCUMENTS

| | | | |
|---|---|---|---|
| 4,302,944 | 12/1981 | Gainer | 62/59 |
| 4,480,445 | 11/1984 | Goldstein | 62/123 |
| 4,509,344 | 4/1985 | Ludwigsen et al. | 62/123 |

*Primary Examiner*—Ronald C. Capossela
*Attorney, Agent, or Firm*—Marshall, O'Toole, Gerstein, Murray & Bicknell

[57] ABSTRACT

Apparatus and methods of cooling which include the storage of cooling capacity or thermal energy in the form of an ice slurry or slush and the subsequent use of the ice for any cooling purpose, including air conditioning and industrial installations which require cooling or refrigeration. A tank is disclosed with equipment for uniformly depositing ice slurry in the tank and for draining liquid through the ice to cool it for use in cooling a facility.

12 Claims, 19 Drawing Figures

METHOD AND APPARATUS OF STORING ICE SLURRY AND ITS USE FOR COOLING PURPOSES

This invention relates to apparatus for, and methods of, cooling. More particularly, this invention is concerned with novel apparatus and methods of cooling which include the storage of cooling capacity or thermal energy in the form of an ice slurry or slush and the subsequent use of the ice for any cooling purpose, including air conditioning and industrial installations which require cooling or refrigeration.

BACKGROUND OF THE INVENTION

Cooling and refrigeration of industrial installations, as well as the central air conditioning of commercial buildings and industrial plants, require large amounts of electrical energy to operate the refrigeration plants needed for these purposes. This places a high demand on electric utilities during on-peak periods, which usually are from about 9 A.M. to 10 P.M. Monday through Friday. Utilities must provide enough generating capacity to meet this demand. This requires a very high capital investment for plants and equipment which are fully utilized only in hot weather in daylight hours. Evenings and weekends are off-peak demand periods and much less of the total generating capacity is used then. In addition, less generating capacity is used on cool days in the spring and fall periods of the year in the United States.

To encourage a better or more uniform demand for electric power, many utilities charge a reduced rate for electricity used during off-peak periods. Business and industry have accordingly been looking for ways to shift or transfer as much as possible of their electrical consumption to off-peak periods to take advantage of the reduced rates and also to minimize future electric rate increases by making additional electric generating plants unnecessary, or at least delaying generating plant expansion.

It has been recognized for some time that a substantial potential savings could be realized if much of the refrigeration or air conditioning load could be moved from on-peak to off-peak periods. To do this, it has been proposed to operate refrigeration plants during off-peak periods to produce cold or chilled water or ice for storage. During on-peak periods the cold or chilled water or ice would then be used to provide cooling. Because ice provides greater cooling capacity per unit volume than chilled water (a ratio of about 7:1) much commercial interest has been directed toward providing so-called ice building equipment for this purpose.

At this time it appears that the type of ice builder of greatest interest, and one which has been put into use in a number of installations, constitutes a tank, for holding water, through which a large number of small pipes run in one of several different patterns or arrangements. A liquid refrigerant is fed through the small pipes. As the refrigerant absorbs heat from the water, a layer of ice about 1 to 3 inches thick forms on each pipe. Ice is produced in this manner during off-peak periods.

When it becomes desirable to utilize the cooling potential stored in the ice for air conditioning or other purposes, a stream of water is fed through the tank to cool the water by exchange of heat to the ice. The cooled water is withdrawn from the tank and fed to a heat exchanger to cool or air condition a building or for other cooling purposes. The resulting warm water is then returned to the tank to be cooled again by contact with the ice. This system can continue to provide cooling until all the ice is melted.

Ice builders of the described type are costly to fabricate and operate. The pipes are not readily repaired or serviced. In addition, as the ice layer on the pipes increases in thickness, heat exchange between the water and refrigerant decreases because of the insulating effect which the ice provides. Furthermore, a very large heat exchange surface must be provided by the pipes to obtain the cooling needed to produce the desired quantity of ice.

Another method proposed is to feed an aqueous liquid through a freeze exchanger in indirect heat exchange with a refrigerant to convert at least part of the aqueous liquid to ice; feed the aqueous liquid-ice mixture from the freeze exchanger to an ice storage tank to provide an ice slurry and aqueous liquid therein; and remove cold aqueous liquid from the ice storage tank and feed it through a heat exchanger in indirect heat exchange with a fluid to be cooled and used for cooling purposes, and then return the warm aqueous liquid exiting from the heat exchanger to the ice storage tank to be cooled by contact with the ice therein.

One of the problems with the method just described involves proper distribution of the ice bed in the storage tank. For efficient operation and maximum ice storage in the tank, the ice should be stored in a bed uniformly thick and with an approximately horizontal or level upper surface. Additionally, the aqueous liquid must drain readily through the ice bed so it can be used for cooling purposes or be recycled to the freeze exchanger to produce more ice to be fed to the tank. An additional problem is inherent in the highly adhesive nature of ice, which clings and sticks to many materials and surfaces.

From the above it is believed clear that a need exists for apparatus and methods of storing ice and using it for cooling purposes.

SUMMARY OF THE INVENTION

According to one aspect of the invention, a method is provided comprising removing aqueous liquid from an ice storage tank, desirably insulated, and feeding the aqueous liquid through a freeze exchanger in indirect heat exchange with a refrigerant to convert at least part of the aqueous liquid to ice crystals; feeding an aqueous liquid-ice crystal mixture from the freeze exchanger to a distribution conduit system, located in the upper part of the ice storage tank above the maximum storage capacity of the tank, through which the mixture flows to and through a plurality of horizontally spaced apart outlets to nozzles which disperse the mixture so that it descends uniformly and deposits the ice crystals evenly as a bed of ice of uniform thickness with a substantially horizontal surface; and removing cold aqueous liquid, which trickles through the ice crystal bed, from the lower part of the tank and feeding it through a heat exchanger in indirect heat exchange with a fluid to be cooled and used for cooling purposes, and then returning the now warm aqueous liquid exiting from the heat exchanger to the ice storage tank to be cooled by downward trickling flowing contact with the ice therein.

The described method makes it possible to store more ice, and thus a greater quantity of refrigeration, in the tank than would be possible if the ice were permitted to cone up in the center of the tank as would happen with a central inlet at the top of the tank. In addition, the uniformly dispersed ice facilitates drainage of liquid through the ice, resulting in more efficient operation of the system. Furthermore, the outlet holes in the conduit distribution system and the nozzles can be comparatively large, i.e. 0.5 to 1 inch in diameter, so there is a very low pressure drop across each nozzle, and little opportunity for ice build-up plugging either the nozzles or outlets. Also, there is very little vertical drop needed to distribute the liquid mixture over a large diameter. Other advantages of the system are that it does not use any moving parts, uses inexpensive parts and minimum labor to fabricate.

In practicing the method, it is desirable to trickle the cold aqueous liquid through the ice crystal bed into a plurality of upright perforated drain tubes in the tank; drain the liquid through the tubes to a liquid accumulating means in the lower part of the tank; and feed the cold aqueous liquid from the lower part of the tank to the freeze exchanger to produce more ice crystals.

By vertically impinging the liquid mixture containing ice crystals on a horizontal target surface constituting part of each nozzle, the liquid mixture and ice crystals are readily uniformly dispersed in the tank.

The distribution conduit system, the nozzles and horizontal target surface constituting part of each nozzle, and the upright perforated drain tubes, can be made of rigid noncorrosive polymeric material which is resistant to ice adhesion to prevent ice from building up and blocking liquid flow or altering uniform distribution of liquid and ice in the tank.

The warm aqueous liquid is desirably returned to the tank through the distribution conduit system used to deposit the ice bed. This makes it possible to cool the warm liquid by passing it uniformly through the porous ice bed. The resulting ice melting is uniform so that the ice bed thickness remains quite even when the method is operated in a cooling mode, as distinguished from an ice making mode. The later addition of ice thus has a uniformly thick ice bed on which to build.

According to a second aspect of the invention, an ice storage tank, desirably insulated, is provided having a bottom, circular cylindrical vertical wall and a roof supported by the wall; a distribution conduit system, located in the upper part of the ice storage tank above the maximum storage capacity of the tank, to which an aqueous liquid-ice crystal mixture originating outside of the tank can be fed to flow therethrough to a plurality of horizontally spaced apart outlets; nozzles, communicating with the outlets, which disperse the liquid mixture so that it descends uniformly and deposits the ice crystals evenly as a bed of ice of uniform thickness with a substantially horizontal surface; and means to remove cold aqueous liquid from the lower internal space of the tank.

The storage tank desirably has a plurality of upright spaced apart perforated drain tubes extending from near the tank bottom to a height near the maximum ice storage capacity of the tank, and through which liquid can drain from the ice crystal bed to the lower internal space of the tank from which cold aqueous liquid is removed.

The tank can have a false bottom or floor above the tank bottom, with said false bottom having means through which liquid can be drained from the ice bed to the lower internal space of the tank between the false bottom and the tank bottom.

Each nozzle can include a horizontal target surface on which the liquid vertically impinges to facilitate uniform distribution of liquid and ice crystals in the tank.

The distribution conduit system, the nozzle and horizontal target surfaces, and the upright perforated drain tubes, in the tank are desirably made of rigid polymeric material which is resistant to ice adhesion.

DETAILED DESCRIPTION OF THE DRAWINGS

To the extent it is reasonable and practical, the same or similar elements or parts which appear in the various views of the drawings will be identified by the same numbers.

Figure 1:
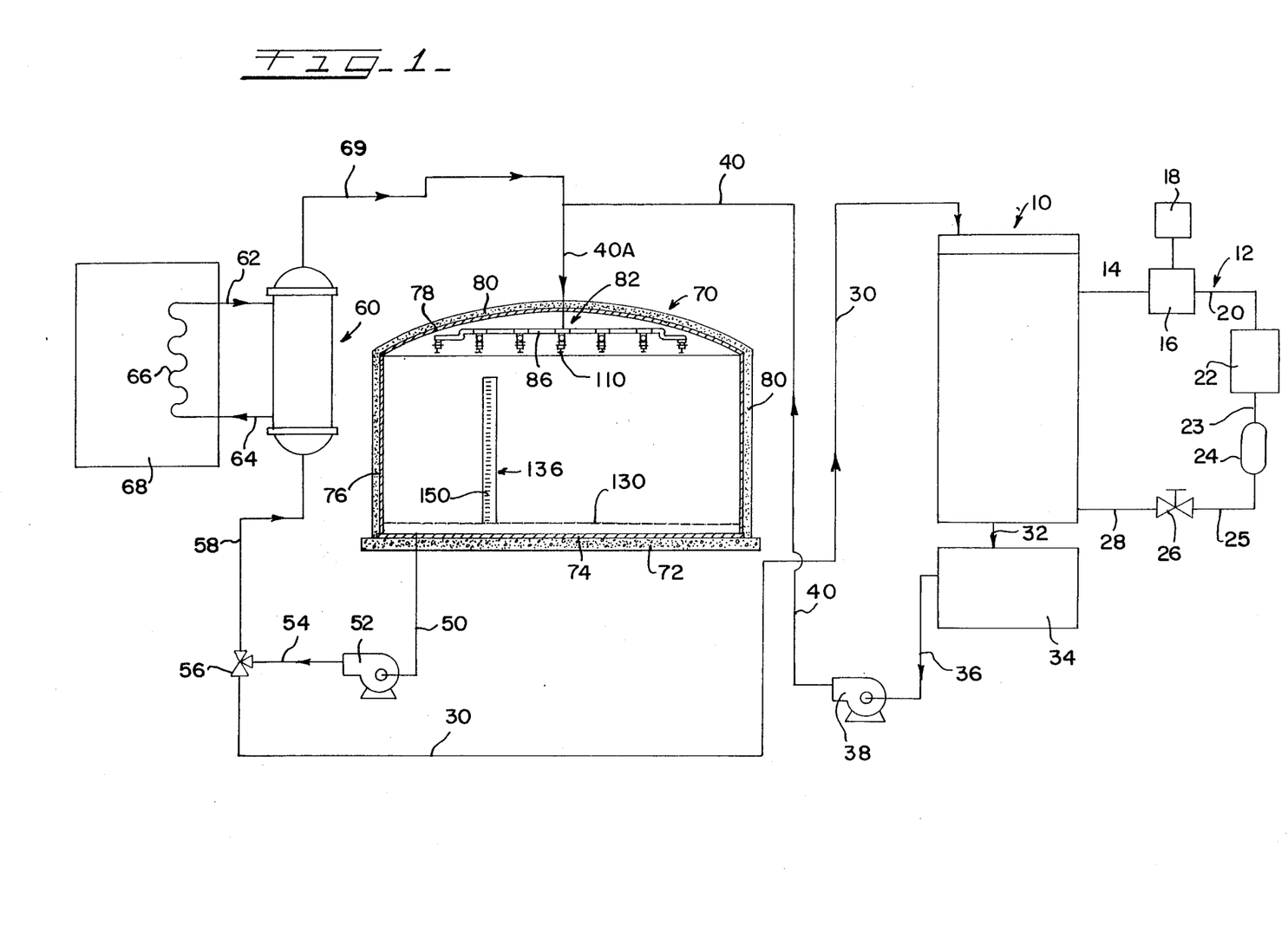
FIG. 1 is a partial schematic drawing, illustrating the invention, which includes a vertical sectional view of an ice storage tank.

With reference to FIG. 1, the freeze exchanger 10 is of the vertical shell and tube falling film type such as disclosed in U.S. Pat. No. 4,286,436. The shell side of the freeze exchanger 10 is cooled by means of a closed loop refrigeration system 12. Gaseous refrigerant, such as ammonia, is removed from the shell side of freeze exchanger 10 by conduit 14 and fed to compressor 16 driven by electric motor 18. The compressed refrigerant is fed from compressor 16 to conduit 20 which delivers it to condenser 22. The liquid refrigerant is removed from condenser 22 by conduit 23 and delivered to refrigerant receiver 24 and then by conduit 25 to expansion valve 26 through which it is expanded to conduit 28 for delivery to the shell side of freeze exchanger 10.

Figure 17:
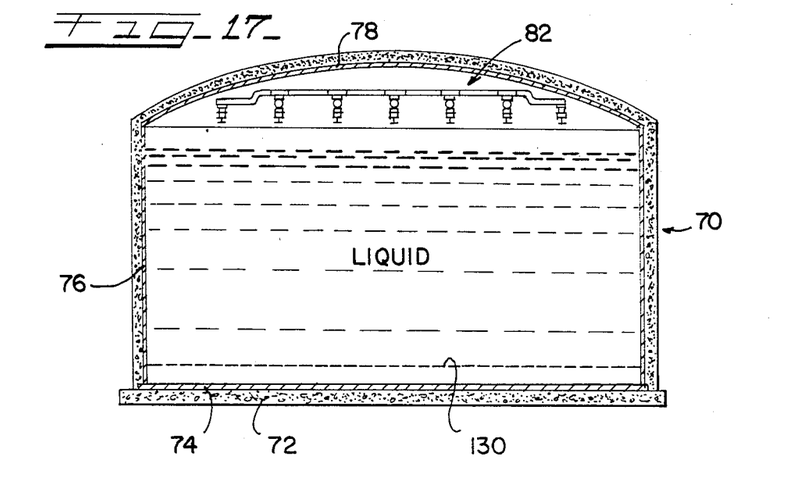
FIG. 17 is a vertical sectional view of the ice storage tank full of liquid with the drainage columns not shown for convenience.
Figure 18:
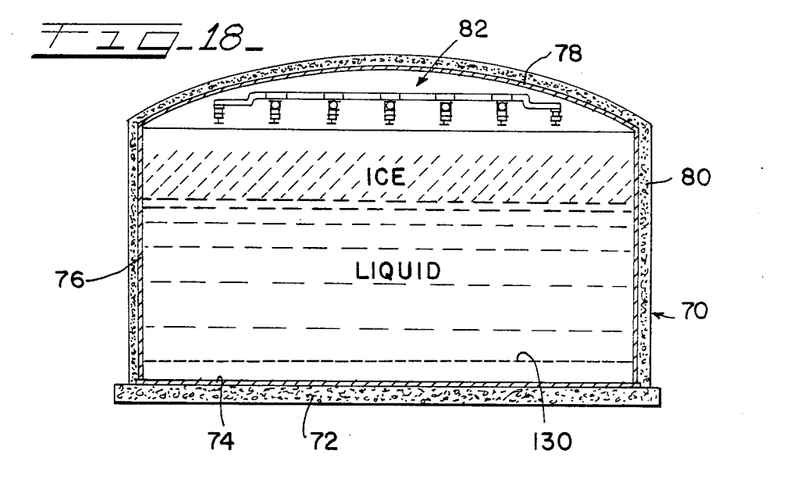
FIG. 18 is similar to FIG. 17 but with the tank partially full of ice.

During ice building, a solution of water and ethylene glycol is withdrawn from ice storage tank 70 through conduit 50 and fed to pump 52. The tank may contain only liquid as shown in FIG. 17 or a layer of ice crystals on liquid as shown in FIG. 18. The liquid is fed from pump 52 to conduit 54 which feeds it through three-way valve 56 to conduit 30. Conduit 30 feeds the liquid to the top of freeze exchanger 10. The liquid flows as a thin falling film down the inner surface of the vertical tubes in the freeze exchanger 10. The liquid is cooled in the tubes and a portion of the water is converted to small ice crystals, thereby forming an ice slurry. The ice slurry flows from freeze exchanger 10 through outlet 32 to receiving vessel 34.

Figure 2:
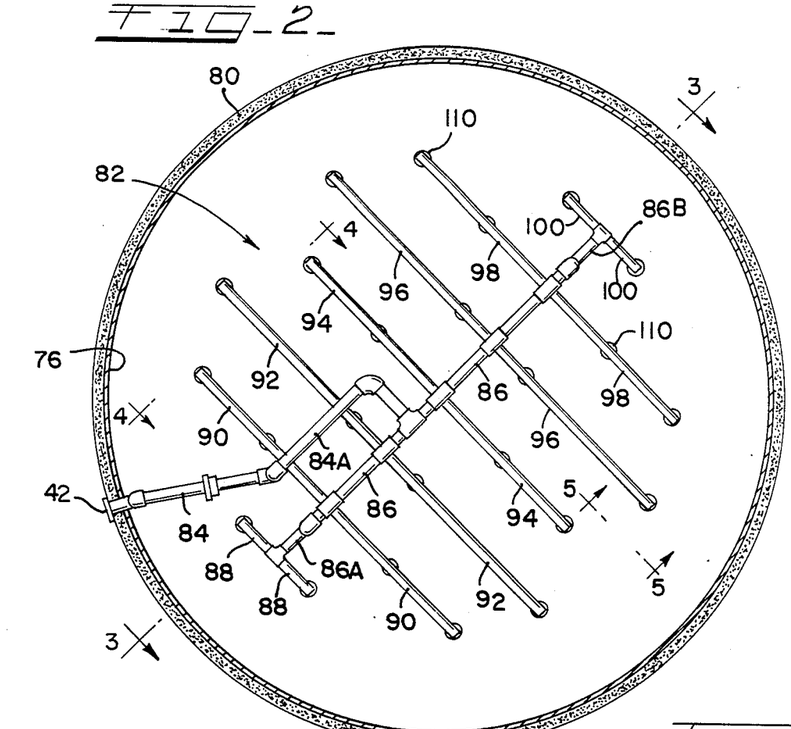
FIG. 2 is a plan view of the liquid and slurry distribution system in the ice storage tank shown in FIG. 1.
Figure 3:
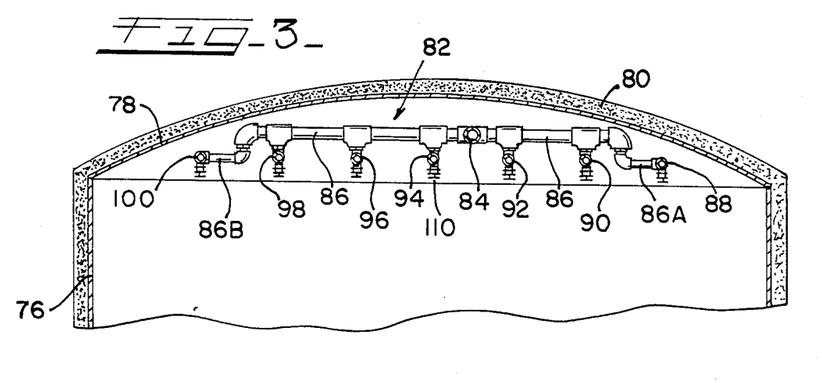
FIG. 3 is a sectional view taken along the line 3—3 of FIG. 2.
Figure 4:
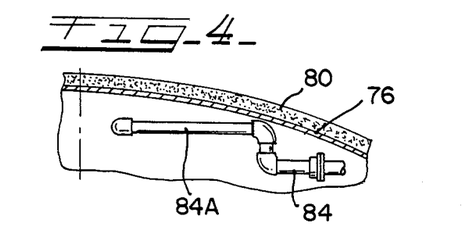
FIG. 4 is a sectional view taken along the line 4—4 of FIG. 2.

The ice slurry collected in receiving vessel 34 is withdrawn by conduit 36 and fed to pump 38 which delivers it to conduit 40. Conduit 40 delivers the ice slurry to conduit 40A which feeds it to inlet port 42 (FIG. 2) in the upper part of tank 70. The ice slurry flows through inlet port 42 to slurry distribution system 82 located in the upper portion of tank 70.

Tank 70 rests on insulating concrete foundation 72, desirably placed directly on earth of good load bearing quality. Tank 70 has a flat metal circular horizontal bottom 74 in direct contact with foundation 72. Vertical cylindrical circular metal wall 76 is joined at its lower edge to tank bottom 74. The upper edge of wall 76 supports dome metal roof 78. Thermal insulation 80 is placed on the exterior surface of wall 76 and roof 78.

Figure 5:
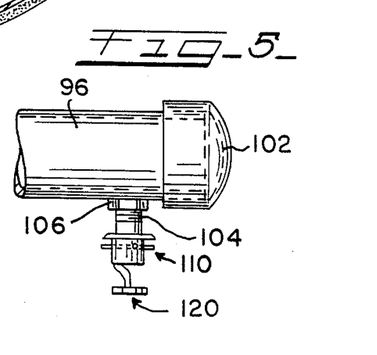
FIG. 5 is a sectional view taken along the line 5—5 of FIG. 2.
Figure 6:
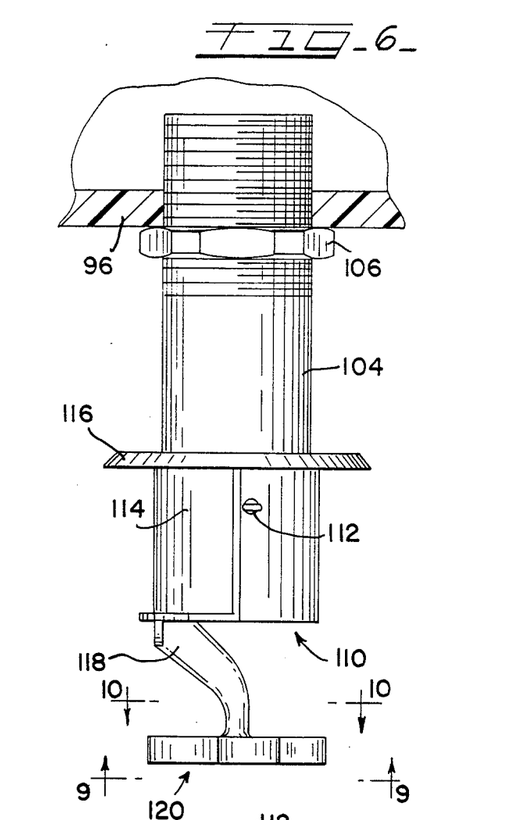
FIG. 6 is a side elevational view of a nozzle mounted on a nipple on a distribution arm.
Figure 7:
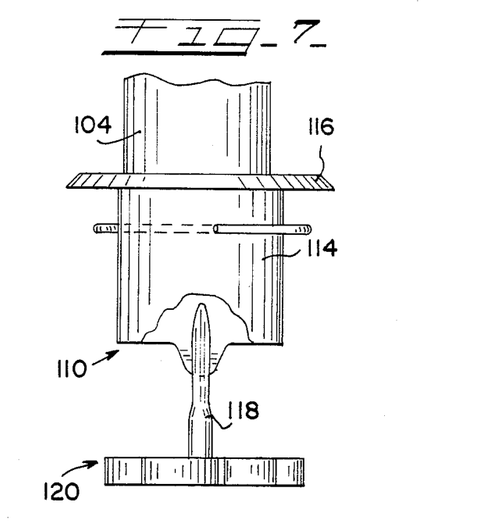
FIG. 7 is a front elevational view, partially broken away, of the nozzle shown in FIG. 6.
Figure 8:
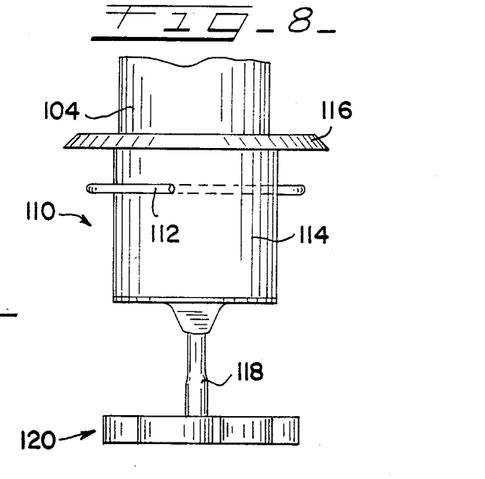
FIG. 8 is a rear elevational view of the nozzle shown in FIG. 6.
Figure 9:
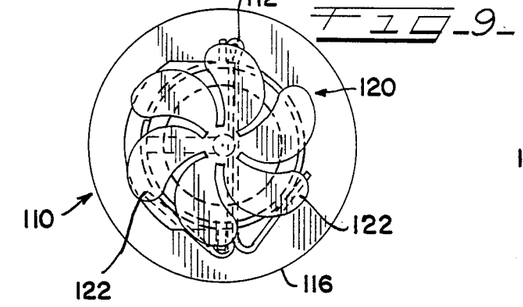
FIG. 9 is a bottom view of the nozzle shown in FIG. 6 taken on the line 9—9 of FIG. 6.
Figure 10:
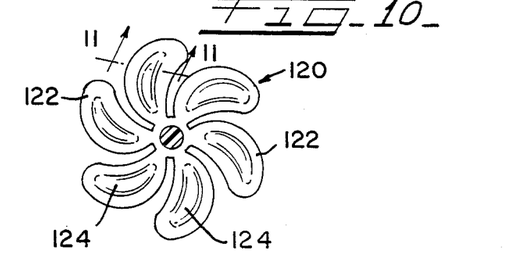
FIG. 10 is a sectional view taken on the line 10—10 of FIG. 6.

Slurry distribution system 82, as shown in FIGS. 2 to 5, includes an ice slurry supply conduit 84 in communication with inlet port 42 and header conduit 86, and a series of spaced apart lateral conduit arms 88, 90, 92, 94, 96, 98, 100 extending outwardly from both sides of header 86. The end of each arm 88-100 is closed by a cap 102 (FIG. 5). It will be seen (FIG. 3) that the ends 86A and 86B of header 86 drop to a lower level to accommodate the slope of roof 78. However, the inner portion 84A of supply conduit 84 is raised slightly (FIG. 4) to place it closer to the tank roof.

A plurality of short small tubular members or nipples 104 (FIGS. 5 to 8) are threaded into holes in the bottom of arms 88-100 and secured in place by lock nut 106. A nozzle 110 is slipped over the end of each nipple 104 and held in place by a cotter pin 112.

Figure 11:
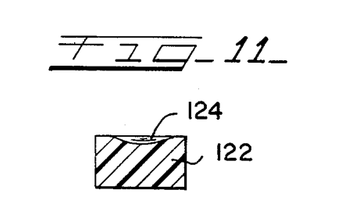
FIG. 11 is a sectional view taken on the line 11—11 of FIG. 10.

The nozzle 110 (FIGS. 6 to 11) is a commercial item available from Marley Co. and has been previously used in cooling towers to distribute water. Each nozzle has a tubular body 114 with a flange or ring 116 at the top. Thin narrow arced leg 118 projects downwardly from the lower edge of tubular body 114 and supports horizontal petal plate 120. Each petal 122 of plate 120 is arranged like the blades of a propeller when viewed axially. The top of each petal 122 is concave or dished 124 (FIG. 11).

All of the conduits and fittings constituting the slurry distribution system 82 are desirably made of polyvinylchloride since it is noncorrosive, inexpensive, lightweight, easily assembled and because ice does not adhere or stick to it readily.

Figure 13:
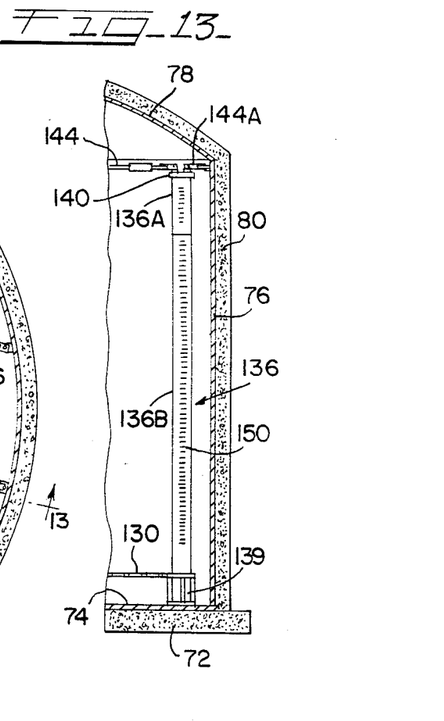
FIG. 13 is a sectional view taken along the line 13—13 of FIG. 12.

A false bottom or floor 130 (FIGS. 1, 13) is supported above tank bottom 74 on base members 134. The false floor contains suitable openings which permit liquid, but not ice crystals, to flow through from the top to the space below it so that liquid can be withdrawn by conduit 50.

Figure 14:
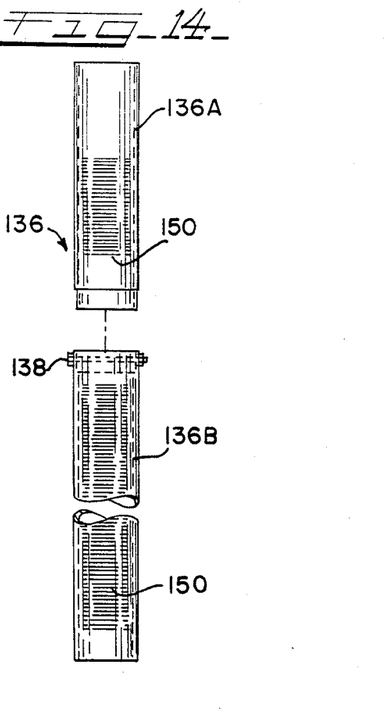
FIG. 14 is a vertical exploded view of a drainage column with the top cap removed.
Figure 15:
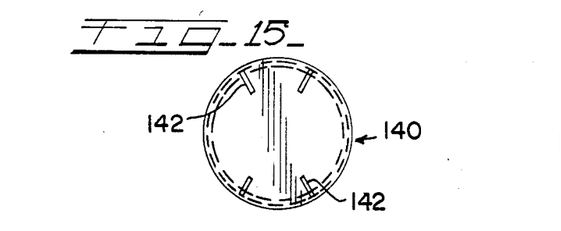
FIG. 15 is a plan view of a cap placed on top of each liquid drainage column.
Figure 16:
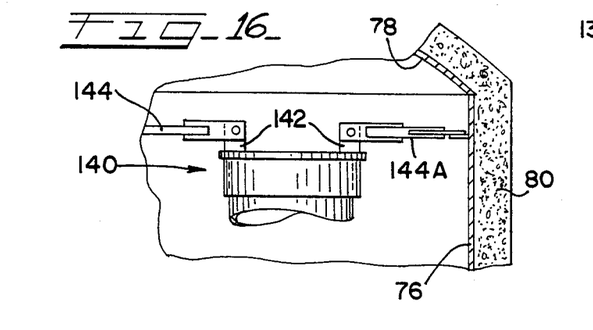
FIG. 16 is an enlarged view of a drainage column cap and support rods attachment thereto.

A plurality of hollow vertical drain columns 136 (FIGS. 1, 13, 14) are positioned in spaced apart arrangement in tank 70. Each column 136 can be supported at the bottom on a base 134. The columns 136 can be made in one piece or of two or more sections 136A, 136B telescoped together and joined by a bolt 138.

Figure 12:
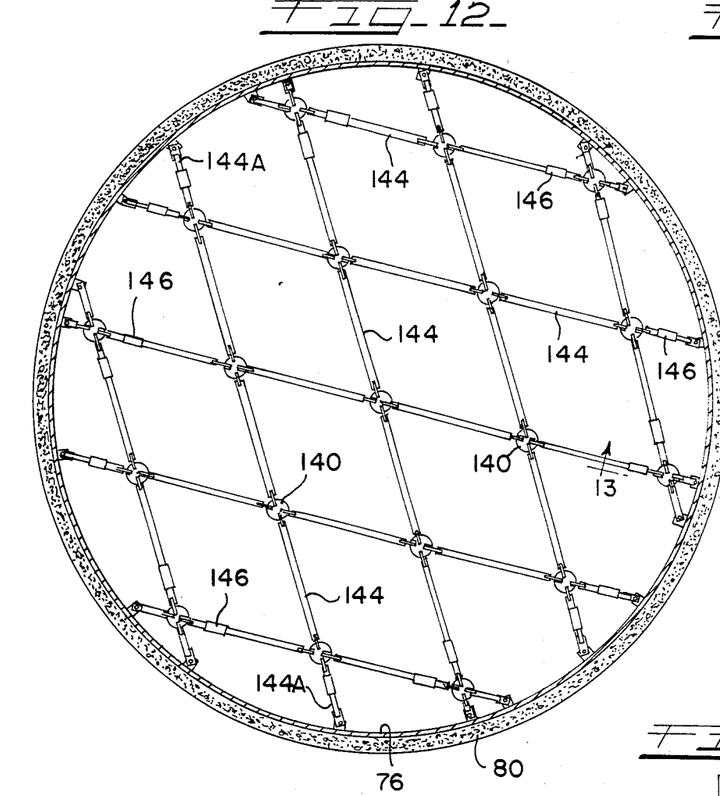
FIG. 12 is a plan view of the support system for the tops of the liquid drainage columns in the tank.

The top of each column 136 is fitted with a cap 140 having a plurality of vertical tabs 142. Rods or pipes 144, some provided with turnbuckles 146, extend between and are joined at their ends to tabs 142 on the caps 140 of adjacent columns 136. The rods are arranged in two patterns of parallel rows which intersect as shown in FIG. 12. Short rods 144A extend from the outermost columns 136 to tank wall 76 thereby tying the described support system for the column tops into the tank itself.

Each column 136 and cap 142 can be made of polyvinylchloride for the reasons given above in discussing the slurry distribution system. Horizontal slits 150 are cut in each column so that liquid can drain into each column but not ice crystals. Liquid which flows through the slits travels down the inside of the column and collects in the tank beneath false floor 130.

In the ice building or forming mode, the ice slurry flows from inlet port 42, through header 86 into arms 88-100, through nipples 104 and out each stationary nozzle 110 and onto petal plate 120. Some slurry flows between petals 122 but most of it impinges on the top of the petals. Because of the flat upper surface of the petals 122, as well as the petal concave portions 124, the ice slurry splashes outwardly in an umbrella pattern which very evenly distributes the slurry over the entire horizontal area of the tank 70. This is achieved without use of any moving parts in the nozzles or elsewhere. This enhances the ice storage volume by almost 10%. Additionally, the slurry distribution system requires very little vertical distance to distribute ice slurry over large areas so that it does not adversely affect ice storage capacity. There is also a very low pressure drop across the nozzles so that power is not wasted.

The liquid phase of the ice slurry drains uniformly through the porous ice pack which builds up in the tank. Some liquid drains directly down and through false floor 130 while a substantial portion of the liquid enters columns 136 through slits 150 and drains through the columns to beneath false floor 130. The described drainage system leads to maximum liquid drainage, thus permitting that the greatest amount of ice possible be stored in the tank. Additionally, it prevents ice from being returned to freeze exchanger 10.

Figure 19:
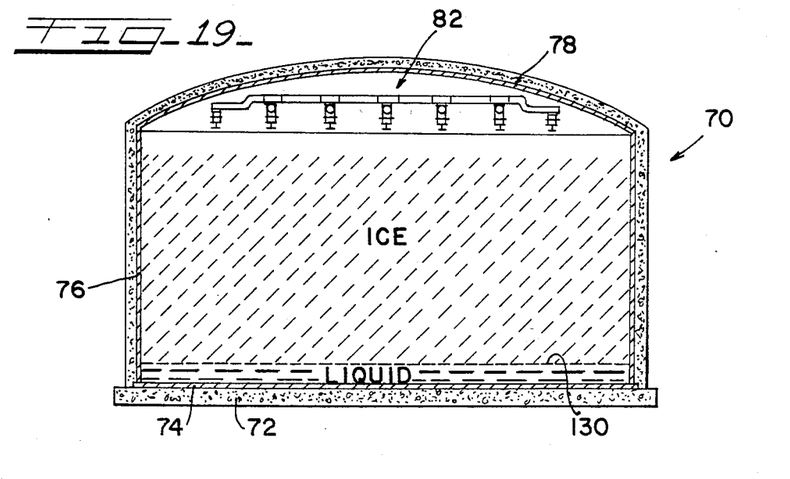
FIG. 19 is similar to FIGS. 17 and 18 but with the tank full of ice.

The described method of ice building can continue as long as desired, but generally will proceed until the ice storage tank 70 is about one-half to three-fourths full of ice with the balance liquid as shown in FIG. 19. For most economical ice building, the apparatus is operated for ice building when electricity rates are the lowest, i.e. at off-peak periods, which usually are from Monday through Thursday evenings from about 10 P.M. to 9 A.M. the following morning, and weekends from 10 P.M. Friday to 9 A.M. Monday. Of course, off-peak periods will vary with location and ambient conditions.

When it is desired to utilize the cooling capacity stored in the form of ice for cooling purposes, cold aqueous liquid can be withdrawn from ice storage tank 70 by conduit 50 and fed to pump 52. Pump 52 delivers the cold aqueous liquid to conduit 54 which feeds it through three-way valve 56 to conduit 58. Conduit 58 feeds the cold liquid to heat exchanger 60 to indirectly cool a warm fluid fed thereto by conduit 62 and withdrawn therefrom through conduit 64 as cold fluid. Conduit 64 feeds the cold fluid to one or more coils 66 in facility 68 to provide cooling thereto. Warm fluid is removed from coil 66 by conduit 62 and returned to heat exchanger 60 to be recooled. Warm aqueous liquid being circulated from the tank is withdrawn from heat exchanger 60 through conduit 69 and is fed by conduit 40A into the distribution system 82 in ice storage tank 70. The warm liquid is distributed uniformly by nozzles 110 over the ice pack. As the warm liquid flows through the ice in tank 70 it is cooled by transfer of heat to the ice, thereby causing the ice to melt. The tank 70 can be full of ice crystals as shown in FIG. 19 at the start of cooling. As heated liquid is returned to tank 70 to be cooled it melts the ice thereby reducing the ice volume (FIG. 18) until finally all the ice is melted (FIG. 17). Thus, this system can continue to operate so long as ice is available in the ice storage tank. Desirably, the amount of ice in the tank available for cooling should be adequate for the intended cooling period.

The described ice building and cooling system can be used as the main cooling system for air conditioning a building, whether operated entirely or primarily during on-peak or off-peak electrical usage periods, or a combination thereof. The system also can be used to shift part of a present existing cooling load to off-peak periods by using it to supplement an existing conventional air conditioning system. Furthermore, the system can be used in air conditioning load leveling by using it in combination with a smaller conventional refrigeration system. Additionally, the system can be used in any industrial installation requiring cooling or refrigeration.

One advantage of the ice building apparatus of the invention is that it employs a freeze exchanger which facilitates ice making with less refrigerant evaporation surface area and better heat transfer than those using extensive pipes in a tank of water on which ice builds to a thickness of about 1 to 3 inches. Another important feature of the apparatus of the invention is that it permits usage of the same liquid in common in the freeze exchanger 10, ice storage tank 70 and heat exchanger 60.

The foregoing detailed description has been given for clearness of understanding only, and no unnecessary limitations should be understood therefrom, as modifications will be obvious to those skilled in the art.

What is claimed is:

1. A method comprising:
   removing aqueous liquid from an ice storage tank and feeding the aqueous liquid through a freeze exchanger in indirect heat exchange with a refrigerant to convert at least part of the aqueous liquid to ice crystals;
   feeding an aqueous liquid-ice crystal mixture from the freeze exchanger to a distribution conduit system, located in the upper part of the ice storage tank above the maximum storage capacity of the tank, through which the mixture flows to and through a plurality of horizontally spaced apart outlets to nozzles which disperse the mixture so that it descends uniformly and deposits the ice crystals evenly as a bed of ice of uniform thickness with a substantially horizontal surface; and
   removing cold aqueous liquid, which trickles through the ice crystal bed, from the lower part of the tank and feeding it through a heat exchanger in indirect heat exchange with a fluid to be cooled and used for cooling purposes, and then returning the now warm aqueous liquid exiting from the heat exchanger to the ice storage tank to be cooled by downward trickling flowing contact with the ice therein.

2. A method according to claim 1 including trickling the cold aqueous liquid through the ice crystal bed into a plurality of upright perforated drain tubes in the tank; draining liquid through the tubes to a liquid accumulating means in the lower part of the tank; and
   feeding the cold aqueous liquid from the lower part of the tank to the freeze exchanger to produce more ice crystals.

3. A method according to claim 2 in which the distribution conduit system, the nozzles and the upright perforated drain tubes, are made of rigid polymeric material which is resistant to ice adhesion.

4. A method according to claim 1 including vertically impinging the liquid mixture containing ice crystals on a horizontal target surface constituting part of each nozzle to uniformly disperse the liquid mixture and ice crystals in the tank.

5. A method according to claim 4 in which the distribution conduit system, the nozzles and horizontal target surface constituting part of each nozzle, and the upright perforated drain tubes, are made of rigid polymeric material which is resistant to ice adhesion.

6. A method according to claim 1 in which the distribution conduit system and the nozzles are made of rigid polymeric material which is resistant to ice adhesion.

7. A method according to claim 1 in which the warm aqueous liquid is returned to the tank through the distribution conduit system used to deposit the ice bed.

8. An ice storage tank having a bottom, circular cylindrical vertical wall and a roof supported by the wall;
   a distribution conduit system, located in the upper part of the ice storage tank above the maximum storage capacity of the tank, to which an aqueous liquid-ice crystal mixture originating outside of the tank can be fed to flow therethrough to a plurality of horizontally spaced apart outlets;
   nozzles, communicating with the outlets, which disperse the liquid mixture so that it descends uniformly and deposits the ice crystals evenly as a bed of ice of uniform thickness with a substantially horizontal surface; and
   means to remove cold aqueous liquid from the lower internal space of the tank.

9. An ice storage tank having a bottom, circular cylindrical vertical wall and a roof supported by the wall;
   a distribution conduit system, located in the upper part of the ice storage tank above the maximum storage capacity of the tank, to which an aqueous liquid-ice crystal mixture originating outside of the tank can be fed to flow therethrough to a plurality of horizontally spaced apart outlets;
   nozzles, communicating with the outlets, which disperse the liquid mixture so that it descends uniformly and deposits the ice crystals evenly as a bed of ice of uniform thickness with a substantially horizontal surface;
   a plurality of upright spaced apart perforated drain tubes extending from near the tank bottom to a height near the maximum ice storage capacity of the tank, and through which liquid can drain from the ice crystal bed; and
   means to remove cold aqueous liquid from the lower internal space of the tank.

10. A tank according to claim 9 including a false bottom above the tank bottom, with said false bottom having means through which liquid can drain from the ice bed to the lower internal space of the tank.

11. An ice storage tank having a bottom, circular cylindrical vertical wall and a roof supported by the wall;

a distribution conduit system, located in the upper part of the ice storage tank above the maximum storage capacity of the tank, to which an aqueous liquid-ice crystal mixture originating outside of the tank can be fed to flow therethrough to a plurality of horizontally spaced apart outlets;

nozzles, communicating with the outlets, which disperse the liquid so that it descends uniformly and deposits the ice crystals evenly as a bed of ice of uniform thickness with a substantially horizontal surface;

each nozzle including a horizontal target surface on which the liquid vertically impinges; and     means to remove cold aqueous liquid from the lower internal space of the tank.

12. A storage tank according to claim 11 in which the distribution conduit system, the nozzle and horizontal target surfaces, and the upright perforated drain tubes, are made of rigid polymeric material which is resistant to ice adhesion.

* * * * *